J. KIRKEBY.
AUTOMATIC GEAR SHIFTING DEVICE.
APPLICATION FILED NOV. 27, 1920.

1,391,193. Patented Sept. 20, 1921.
2 SHEETS—SHEET 1.

WITNESS
INVENTOR
John Kirkeby.
BY
ATTORNEYS

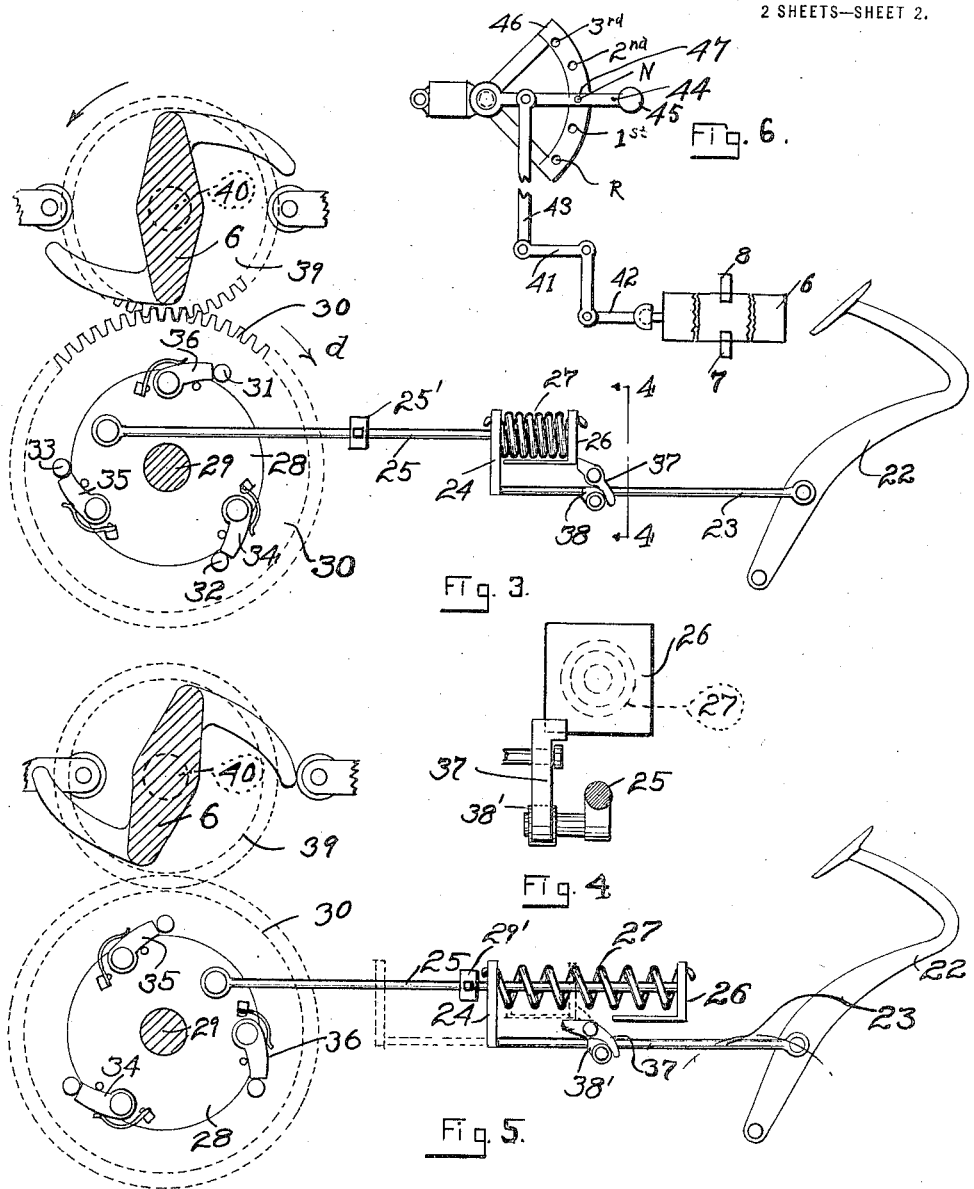

UNITED STATES PATENT OFFICE.

JOHN KIRKEBY, OF SAN LUIS OBISPO, CALIFORNIA.

AUTOMATIC GEAR-SHIFTING DEVICE.

1,391,193.

Specification of Letters Patent.  Patented Sept. 20, 1921.

Application filed November 27, 1920.  Serial No. 426,792.

*To all whom it may concern:*

Be it known that I, JOHN KIRKEBY, a citizen of the United States, and resident of San Luis Obispo, county of San Luis Obispo, State of California, have invented a new and useful Automatic Gear-Shifting Device, of which the following is a specification.

This invention relates to improvements in gear shifting devices and is designed more particularly for use with automobiles of the class using sliding gear speed changing transmission, and its principal object is to provide means whereby a predetermined change can be made by the action of the clutch pedal controlled by a dial or the like.

Another object is to replace the shifting lever now in use with a mechanism connecting directly with the shifting rods, or forks where the shifting rods are incorporated in the cover of the transmission.

Another object is to make a simple and compact device and one that will be positive in its action and readily attached to automobiles now in use.

Other objects will appear as the description proceeds.

Figure 1:
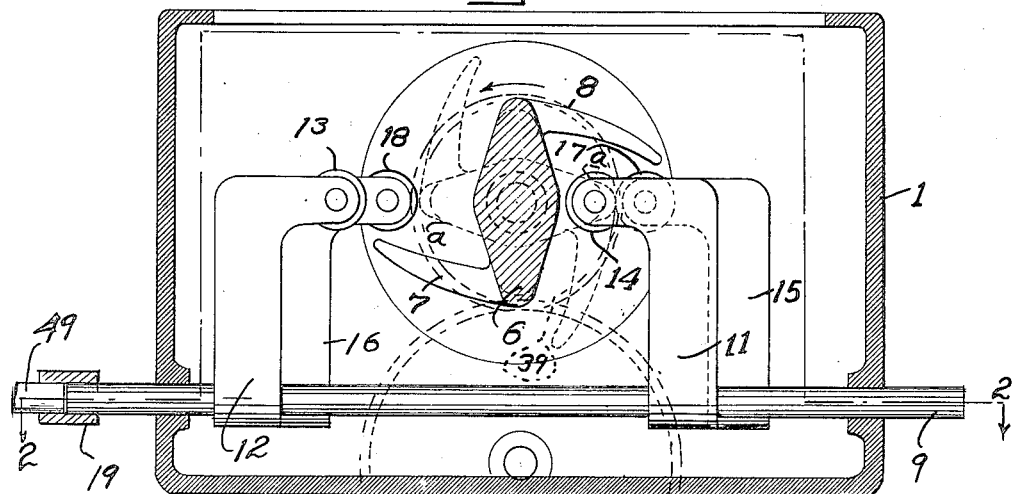
Figure 2:
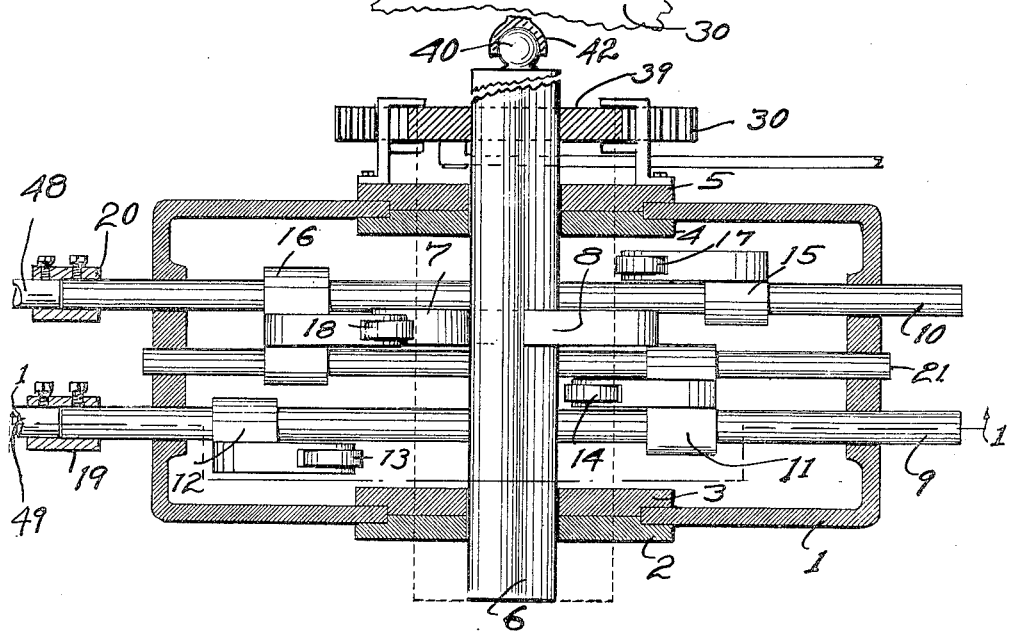

On the accompanying drawing, similar numerals refer to similar parts throughout the several views, in which Figure 1 is a longitudinal section on line 1—1 of Fig. 2; Fig. 2 is a section on line 2—2 of Fig. 1; Fig. 3 is a side elevation showing means for operating the mechanism; Fig. 4 shows a detail of trigger taken on line 4—4 of Fig. 3; Fig. 5 is the same view as Fig. 3 but showing the cam turned one half turn and Fig. 6 shows a dial and mechanism for operating the sliding cam.

The numeral (1) indicates a frame, in which the rotatable flanges (2) to (5) inclusive are mounted. Mounted to slide through all of said flanges is the cam (6), adapted to revolve with the flanges. Fixed on the cam (6) are the projecting fingers (7) and (8) the ends of which project outside of the path of motion of the cam. Slidably mounted in the frame (1) are the rods (9) and (10) adapted to reciprocate at right angles to cam (6). Fixed on the rod (9) are the arms (11) and (12) and mounted in the arms are the rollers (13) and (14). Fixed on the rod (10) are the arms (15) and (16) with the rollers (17) and (18) mounted therein. The arms are set so that the rollers just clear the cam at its longitudinal diameter as shown by the dotted lines in Fig. 1 at *a*. The cam in this position sets all of said rollers to neutral. The projecting fingers are adapted to engage any one of the rollers as the cam is moved so as to bring the fingers in line with the roller selected as will be described in the operation. The rods (9) and (10) are connected to the shift rods (48) and (49) of the automobile by means of couplings (19) and (20). The arms (11) and (16) slide on a guide rod (21) which give adequate support for the arms. Means for turning the cam (6) are shown in Figs. 3, 4 and 5. To the clutch pedal (22) is pivoted a rod (23) which carries an arm (24). A rod (25) is adapted to slide through a hole in said arm, and carry the bracket (26). On rod (25) between bracket (26) and arm (24) is a coil spring (27). The other end of rod (25) is pivoted to a revoluble disk (28) mounted on the shaft (29), and on the side of the disk is mounted a gear (30) which is adapted to be turned in the direction of the arrow *d* by means of pins (31) to (33) inclusive being engaged by the pawls (34) to (36) inclusive. Pivoted in a suitable place on the frame of the car is the trigger (37) which is adapted to catch the bracket (26) when the clutch pedal is back and the rod (25) is in the position shown in Fig. 3, with the cam (6) in position to slide to engage any of the rollers (13) (14) (17) or (18). On the rod (23) is a lug (38) adapted to engage the trigger (37) and release it from the bracket (26) on the extreme forward movement of clutch pedal, whereupon the spring (27) will push the bracket forward and give the disk (28) and gear (30) a one third turn, and the ratio of gear (30) to gear (39) is such as to give the cam a half turn. In Fig. 6 is shown means to set the cam to any desired position. The ball (40) is connected to a bell crank (41) by means of the socket link (42). A rod (43) connects the bell crank to a lever (44) provided with a suitable handle (45). The lever (44) is pivoted to swing in quadrant (46) which may be fixed in any suitable position, as on the steering post. The quadrant has spaced holes corresponding to the number of changes; in this instance there are five holes into which a pin (47) on the lever (44) is adapted to engage. Each hole represents a setting; as for instance when the lever is moved so the pin engages the center hole the cam is set for neutral, and when down to first hole it is set for first speed, and second hole for reverse. The first hole up from neutral is second speed and the second hole up is third or high. When the cam (6) is set to the middle position the projecting fingers (7) and (8) do not engage any of the rollers and the cam brings all rollers into neutral position. When set for first speed the projections (7) or (8) will engage roller (14) and move the rod (9) and with it the shift rod (49) to first speed. When set for reverse the projections will engage the roller (13) and move the rod (9) back to neutral. When set for second speed the projections (7) or (8) will engage roller (18) and move the rod (10) and shift rod (48) to second speed. When set for high or third speed the projections (7) or (8) will engage roller (17) and move the rod (10) to third speed. The lever (44) can be set for any desired change of gear while the machine is running and then when the clutch pedal is released the change is made automatically.

What I claim is as follows but I am aware that modifications may be made in the construction of the above described form within the cope of my invention.

I claim:

1. A gear shifting device for a sliding gear change transmission, comprising horizontal rods controlling the shifting rods, a pair of arms rigidly secured to each horizontal rod, a cam shaft mounted transversely to said rod in operative relation to the arms, said cam shaft having two opposing cams extending throughout its operative area adapted to dispose all the arms simultaneously at an equal distance from its axis, whereby all gears are thrown into neutral upon a certain turning of said cam shaft, and tangential fingers on each cam of increasing radial distance from its axis adapted to engage, on a continuation of the turn, any one of the arms and to push it farther from its axis, whereby a corresponding gear is engaged.

2. A gear shifting device for a sliding gear change transmission, comprising horizontal rods controlling the shifting rods, a pair of arms rigidly secured to each horizontal rod, a cam shaft mounted transversely to said rod in operative relation to the arms, said cam shaft having two opposing cams extending throughout its operative area adapted to dispose all the arms simultaneously at an equal distance from its axis, whereby all gears are thrown into neutral upon a certain turning of said cam shaft, tangential fingers on each cam of increasing radial distance from its axis adapted to engage, on a continuation of the turn, any one of the arms and to push it farther from its axis, whereby a corresponding gear is engaged, and means controlled by the clutch pedal for imparting said rotary motion to the cam shaft.

3. A gear shifting device for a sliding gear change transmission, comprising horizontal rods controlling the shifting rods, a pair of arms rigidly secured to each horizontal rod, a cam shaft mounted transversely to said rod in operative relation to the arms, said cam shaft having two opposing cams extending throughout its operative area adapted to dispose all the arms simultaneously at an equal distance from its axis, whereby all gears are thrown into neutral upon a certain turning of said cam shaft, tangential fingers on each cam of increasing radial distance from its axis adapted to engage, on a continuation of the turn, any one of the arms and to push it farther from its axis, whereby a corresponding gear is engaged, and means disposed within reach of the driver for bringing the fingers on the cam shaft into operative engagement with the arm desired.

4. A gear shifting device for a sliding gear change transmission, comprising horizontal rods controlling the shifting rods, a pair of arms rigidly secured to each horizontal rod, a cam shaft mounted transversely to said rod in operative relation to the arms, said cam shaft having two opposing cams extending throughout its operative area adapted to dispose all the arms simultaneously at an equal distance from its axis, whereby all gears are thrown into neutral upon a certain turning of said cam shaft, tangential fingers on each cam of increasing radial distance from its axis adapted to engage, on a continuation of the turn, any one of the arms and to push it farther from its axis, whereby a corresponding gear is engaged, means controlled by the clutch pedal for imparting said rotary motion to the cam shaft, and means disposed within reach of the driver for bringing the fingers on the cam shaft into operative engagement with the arm desired.

5. A gear shifting device comprising in combination, an automobile with a clutch operated by a pedal, a sliding gear speed changing transmission controlled by shifting rods projecting therefrom, extensions connected to said rods, said extensions being mounted to slide in a frame, arms fixed to said extensions, a rotatable cam slidably mounted transversely of said extensions, projections on said cam adapted to engage any one of said arms, a pivoted lever with connecting links adapted to slide said cam, a quadrant on which said lever is pivoted, stop on said quadrant for said lever, said stop corresponding to gear changes in said transmission, a gear wheel adapted to turn said cam, a drive gear in mesh with said gear, a disk carrying pawls adapted to engage pins on said drive gear, a shaft for said drive gear, a connecting rod pivoted on said disk, a bracket on the free end of said rod, a bracket slidable on said rod, a link connecting said slidable bracket with said clutch pedal, a coil spring between said end bracket and said slidable bracket on said rod, a trigger adapted to hold said coil spring situated between said brackets and a lug on said link for releasing said trigger.

JOHN KIRKEBY.